United States Patent
Son et al.

(10) Patent No.: US 7,719,465 B2
(45) Date of Patent: May 18, 2010

(54) METHOD OF ACQUIRING INITIAL GPS SIGNAL IN BROADCASTING SYSTEM AND SYSTEM USING THE METHOD

(75) Inventors: Hyung-Chul Son, Suwon-si (KR); Hak-Ryoul Kim, Seongnam-si (KR); Jae-Seung Yoon, Seoul (KR); Chan-Woo Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/089,478

(22) PCT Filed: Oct. 9, 2006

(86) PCT No.: PCT/KR2006/004041
§ 371 (c)(1),
(2), (4) Date: Jun. 15, 2008

(87) PCT Pub. No.: WO2007/040375
PCT Pub. Date: Apr. 12, 2007

(65) Prior Publication Data
US 2009/0267831 A1   Oct. 29, 2009

(30) Foreign Application Priority Data
Oct. 6, 2005 (KR) ............ 10-2005-0094047

(51) Int. Cl.
*G01S 1/02* (2006.01)
(52) U.S. Cl. .................. 342/357.09; 342/357.15
(58) Field of Classification Search ........... 342/357.03, 342/357.05, 357.06, 357.09, 357.15; 701/207, 701/213, 215
See application file for complete search history.

(56) References Cited

U.S. PATENT DOCUMENTS 6,295,023 B1 * 9/2001 Bloebaum .............. 342/357.06
6,538,600 B1   3/2003 Richton et al.
7,133,772 B2 * 11/2006 van Diggelen .............. 701/207

(Continued)

FOREIGN PATENT DOCUMENTS

EP    0 874 248    4/1998

(Continued)

OTHER PUBLICATIONS

Int'l Search Report (PCT/ISA/210) (2 pp), Dec. 29, 2006, KR.

*Primary Examiner*—Dao L Phan
(74) *Attorney, Agent, or Firm*—The Farrell Law Firm, LLP

(57) ABSTRACT

A system and method for acquiring an initial Global Positioning System (GPS) signal in a communication system including a terminal. The system includes an Assisted GPS (AGPS) server for generating Acquisition Assistance (AA) data distinguished according to an area based on a pre-set position of each service area, a transmitting station for broadcasting the generated AA data to terminals, and the terminals for acquiring an initial GPS signal by receiving the broadcasted AA data. In addition, the method includes the steps of generating AA data distinguished according to an area based on a pre-set position of each service area, broadcasting the generated AA data to terminals, and acquiring, by each of the terminals, a GPS signal by receiving the broadcasted AA data.

21 Claims, 10 Drawing Sheets

U.S. PATENT DOCUMENTS

| | | |
|---|---|---|
| 2003/0151547 A1 | 8/2003 | Mauro et al. |
| 2004/0142660 A1* | 7/2004 | Churan ..................... 455/12.1 |
| 2005/0192027 A1 | 9/2005 | Kim et al. |
| 2006/0012515 A1* | 1/2006 | Park et al. .............. 342/357.02 |
| 2007/0183486 A1* | 8/2007 | Cheng et al. ................ 375/150 |
| 2007/0252758 A1* | 11/2007 | Loomis ................ 342/357.15 |
| 2008/0150796 A1* | 6/2008 | Syrjarinne ............ 342/357.01 |

FOREIGN PATENT DOCUMENTS

| | | |
|---|---|---|
| KR | 1019980081713 | 11/1998 |
| KR | 2004-82572 | 9/2004 |
| KR | 2005-83494 | 8/2005 |
| KR | 1020050081961 | 8/2005 |
| WO | WO2004-070513 A2 | 8/2004 |

* cited by examiner

| AREA ID<br>(401) | GAP FILLER ID<br>(403) |
|---|---|
| ID-A | { ID001<br>⋮<br>ID100 |
| ID-B | { ID101<br>⋮<br>ID200 |
| ID-C | { ID201<br>⋮<br>ID301 |

| AREA ID<br>(409) | GAP FILLER ID<br>(411) |
|---|---|
| A | { A0000001h<br>⋮<br>AFFFFFFFh |
| B | { B0000001h<br>⋮<br>BFFFFFFFh |
| C | { C0000001h<br>⋮<br>CFFFFFFFh |

METHOD OF ACQUIRING INITIAL GPS SIGNAL IN BROADCASTING SYSTEM AND SYSTEM USING THE METHOD

BACKGROUND OF THE INVENTION

1. Field of the Invention

The present invention relates generally to a method of acquiring a Global Positioning System (GPS) signal in a communication system and a system and terminal using the method, and in particular, to a method of receiving assistance information for acquiring an initial GPS signal in a communication system and a system and terminal using the method.

2. Description of the Related Art

In general, it takes a long time for a terminal in a mobile communication system to acquire a Global Positioning System (GPS) signal required to determine its position. In order to reduce an initial GPS signal acquisition time, Assisted GPS (AGPS) technology for providing rough code phase and Doppler frequency information is used, wherein the code phase and Doppler frequency information is called Acquisition Assistance (AA) data. Since a code and frequency search range can be reduced using the AA data when a receiver processes a GPS signal, the initial GPS signal acquisition time can be reduced.

A method of receiving AA data in a conventional mobile communication system will now be described with reference to FIG. 1.

FIG. 1 is a block diagram illustrating a conventional mobile communication system uses a GPS function. Referring to FIG. 1, a mobile communication system 100 includes GPS satellites 101, an Assisted GPS (AGPS) server 103, a communication provider server 105, a base station 107, and a terminal 109. A method for the terminal 109 to receive AA data will now be described. The terminal 109 requests the AGPS server 103 for the AA data. When the AGPS server 103 receives the AA data request from the terminal 109 via the base station 107 and the communication provider server 105, the AGPS server 103 detects the base station 107 with which the terminal 109 currently communicates and determines a rough position of the terminal 109 based on the detected base station 107.

The AGPS server 103 calculates a code phase and a Doppler frequency of a GPS signal using the rough position of the terminal 109 and positions of the GPS satellites 101 and transmits AA data 113 including the calculated code phase and Doppler frequency to the terminal 109. The terminal 109 receives the AA data and uses the received AA data for a GPS signal search.

According to the conventional technology for generating and transmitting AA data using a mobile communication network, the AA data can be generated only if a mobile terminal provides information on a base station with which the mobile terminal communicates to an AGPS server. In addition, a process for the mobile terminal to request the AGPS server for AA data and connect a traffic channel to receive data provided by the AGPS server is required. Thus, since a method for a mobile terminal to request for AA data does not exist in a one directional broadcasting system such as a Digital Multimedia Broadcasting (DMB) system, the conventional method cannot be applied to the one-directional broadcasting system.

SUMMARY OF THE INVENTION

An object of the present invention is to substantially solve at least the above problems and/or disadvantages and to provide at least the advantages below. Accordingly, an object of the present invention is to provide a method of efficiently acquiring a Global Positioning System (GPS) signal in a broadcasting system and a system and terminal using the method.

Another object of the present invention is to provide a method of receiving Acquisition Assistance (AA) data for efficiently acquiring a GPS signal in a broadcasting system and a system and terminal using the method.

According to one aspect of the present invention, there is provided a Digital Multimedia Broadcasting (DMB) system for providing a service by dividing an entire broadcasting service area into at least one area, the DMB system including an Assisted GPS (AGPS) server for generating AA data distinguished according to an area based on a pre-set position of each service area a transmitting station for broadcasting the generated AA data to terminals, and the terminals for acquiring an initial GPS signal by receiving the broadcasted AA data.

When the entire broadcasting service area is operated as one area, the AGPS server may generate the AA data by calculating a code phase and a Doppler frequency of each GPS satellite based on a pre-set position of the service area.

When the entire broadcasting service area is operated as more than two areas, the AGPS server may generate the AA data by calculating a code phase and a Doppler frequency of each GPS satellite based on a pre-set position of each service area.

When the entire broadcasting area is operated as more than two areas, each of the terminals may search for its area based on data previously received from a gap filler and acquire a GPS signal using data corresponding to its area among the received AA data.

The AA data may include a GPS time field indicating time determined based on the GPS signal, a Satellite Vehicle Pseudo Random Number (SV PRN) field indicating code information for identifying each GPS satellite, and a code phase and Doppler frequency field for acquiring a GPS signal.

The AA data may further include an area identifier (ID) indicating information indicating a position used as a reference of each area.

The transmitting station may periodically broadcast the AA data.

According to another aspect of the present invention, there is provided a method of acquiring an initial GPS signal in a Digital Multimedia Broadcasting (DMB) system for providing a service by dividing an entire broadcasting service area into at least one area, the method including the steps of generating AA data distinguished according to an area based on a pre-set position of each service area, broadcasting the generated AA data to terminals, and acquiring, by each of the terminals, a GPS signal by receiving the broadcasted AA data.

The step of generating AA data may include calculating a code phase and a Doppler frequency of each GPS satellite based on a pre-set position of the service area when the entire broadcasting service area is operated as one area, and inserting the calculated code phase and Doppler frequency information into the AA data and broadcasting the AA data to the terminals.

The step of generating AA data may include calculating a code phase and a Doppler frequency of each GPS satellite based on a pre-set position of each service area when the entire broadcasting service area is operated as more then two areas, and inserting the calculated code phase and Doppler frequency information into the AA data and broadcasting the AA data to the terminals.

The step of broadcasting the generated AA data may include determining, by each of the terminals, its area based on data previously received from a gap filler when the entire broadcasting service area is operated as more than two areas, and searching for a GPS signal using data corresponding to the corresponding terminal's area among the received AA data.

According to another aspect of the present invention, there is provided a terminal of a Digital Multimedia Broadcasting (DMB) system for providing a service by dividing an entire broadcasting service area into at least one area, the terminal including a broadcasting receiving part for receiving a DMB signal including AA data distinguished according to an area based on a pre-set position of each service area; and a GPS receiving part for acquiring an initial GPS signal based on the received AA data.

The broadcasting receiving part may include a DMB signal receiver for receiving the DMB signal, a DMB channel decoder for extracting the AA data from the DMB signal, and an AA data processing unit for receiving and storing the AA data and transmitting the stored AA data to the GPS receiving part when the stored AA data is requested from the GPS receiving part.

The GPS receiving part may include a GPS signal receiver for requesting the AA data processing unit for AA data of relevant GPS satellites and searching for a GPS signal using the AA data received from the AA data processing unit, and a position determiner for determining a position of the terminal using the found result.

The broadcasting receiving part may include a DMB signal receiver for receiving the DMB signal, a DMB channel decoder for extracting the AA data, which includes a gap filler identifier (ID) indicating each service area, from the DMB signal, an area determiner for extracting area information based on the gap filler ID received from the DMB channel decoder and storing the extracted area information, and an AA data processing unit for transmitting AA data to the GPS receiving part based on an area ID of currently received AA data and the area information previously stored in the area determiner when AA data is requested from the GPS receiving part.

The area determiner may include a table including the gap filler ID and an area corresponding to the gap filler ID.

The area determiner may extract the area information using an area ID included in the AA data.

The GPS receiving part may include a GPS signal receiver for requesting the AA data processing unit for AA data of a selected GPS satellite and searching for a GPS signal using the AA data received from the AA data processing unit, and a position determiner for determining a position of the terminal using the found result.

According to another aspect of the present invention, there is provided a method of acquiring an initial GPS signal in a terminal of a Digital Multimedia Broadcasting (DMB) system for providing a service by dividing an entire broadcasting service area into at least one area, the method including steps of extracting AA data, which is distinguished according to each area based on a pre-set position of each service area, by receiving a DMB signal, and acquiring an initial GPS signal based on the extracted AA data.

The step of extracting AA data may include determining an area based on an area ID indicating area information among data previously received from a gap filler when the entire broadcasting service area is operated as more than two areas, and extracting data corresponding to the area ID from the received AA data.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
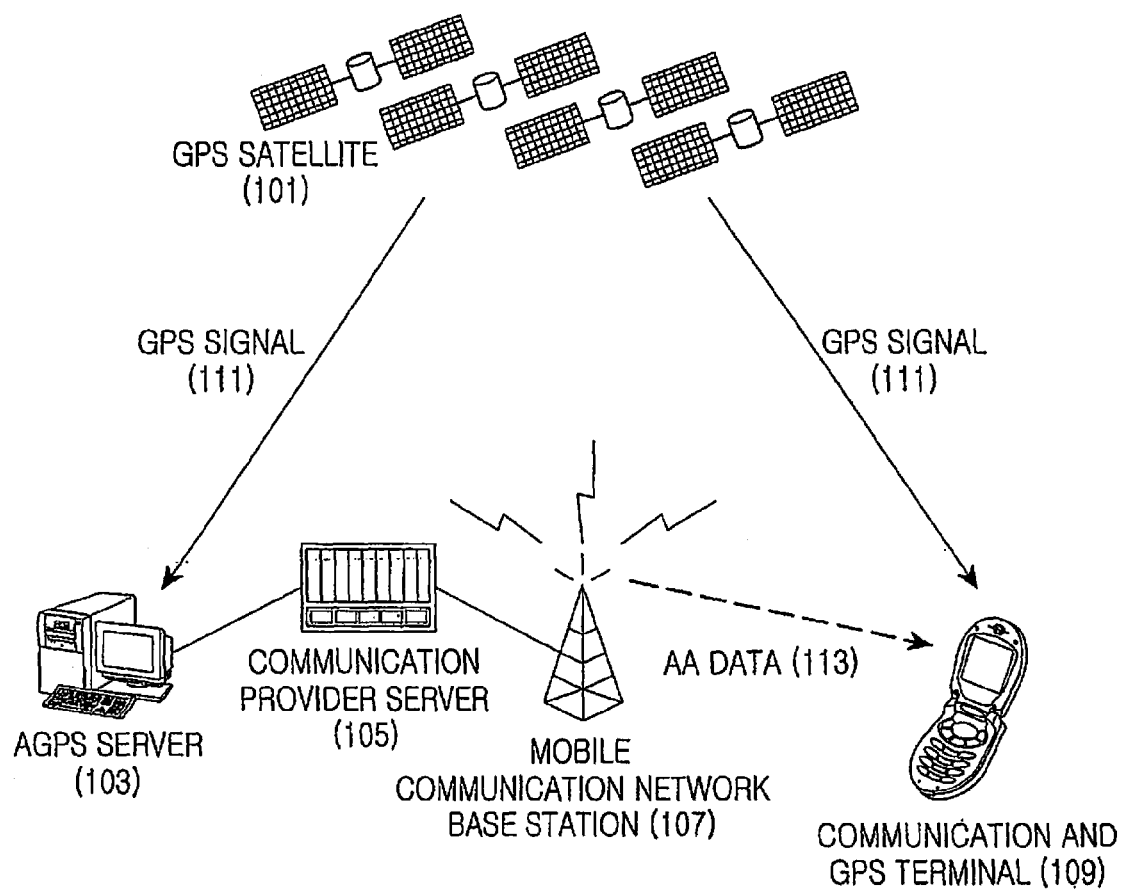
FIG. 1 is a block diagram illustrating a conventional mobile communication system.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention suggests a method of receiving Acquisition Assistance (AA) data in order to efficiently acquire a Global Positioning System (GPS) signal in a broadcasting system and a system using the method. In the specification, a broadcasting system according to the present invention will be first described, and then a method of generating AA data received through a broadcasting channel in the broadcasting system will be described. In addition, a method for a broadcasting receiver of the broadcasting system to efficiently receive a GPS signal using the AA data will be described.

The present invention relates to technology applied to a broadcasting system. However, for convenience of description, the present invention will be described using a Digital Multimedia Broadcasting (DMB) system.

Figure 2:
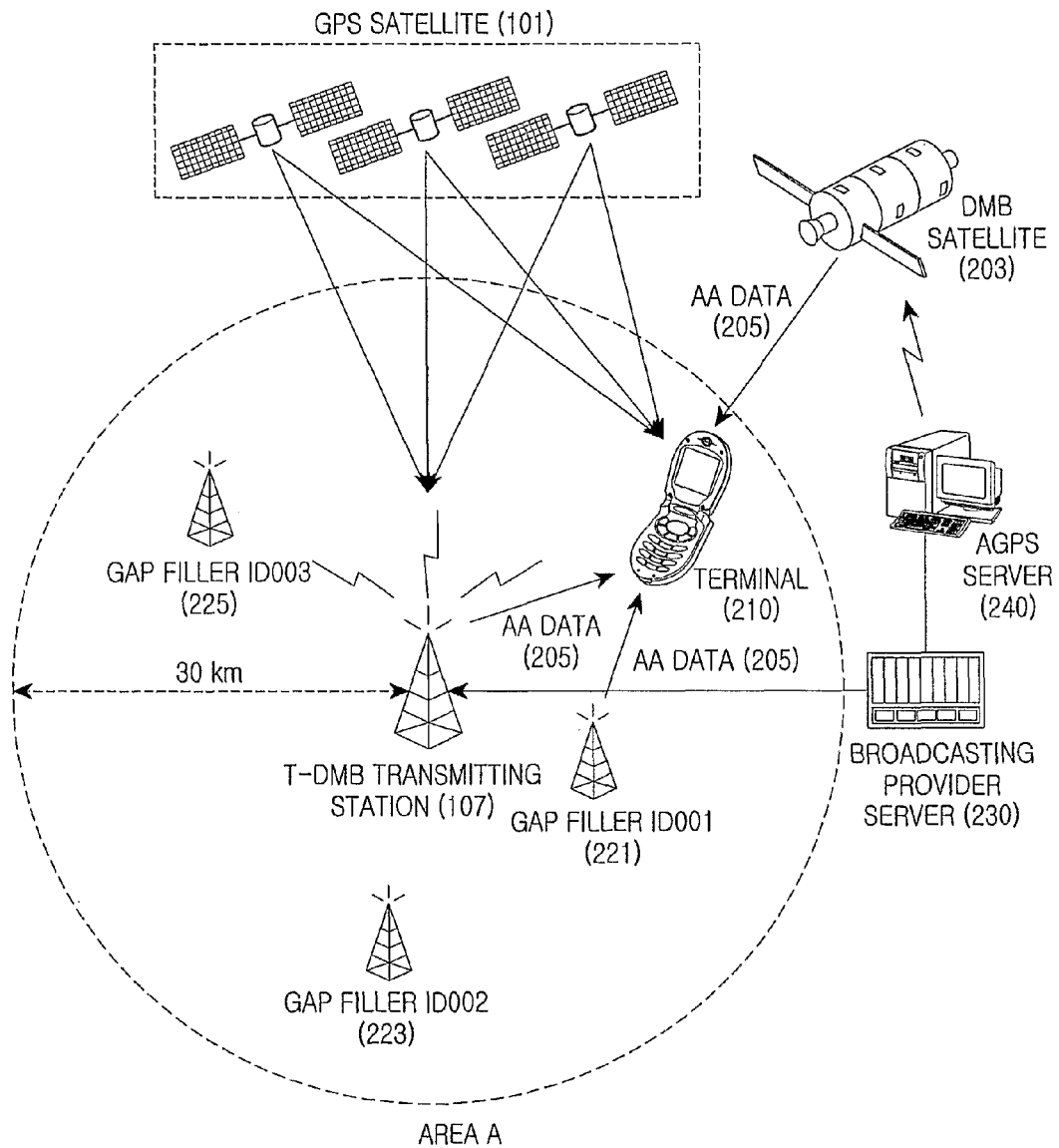
FIG. 2 is a block diagram illustrating a broadcasting system according to the present invention.

FIG. 2 is a diagram illustrating a broadcasting system, i.e., a DMB system according to a preferred embodiment of the present invention. Although the DMB system is classified into satellite DMB (S-DMB) and terrestrial DMB (T-DMB), since the present invention can be applied to both S-DMB and T-DMB, FIG. 2 illustrates both S-DMB and T-DMB.

Referring to FIG. 2, the DMB system includes a broadcasting terminal 210 for receiving a GPS signal from GPS satellites 101, an Assisted GPS (AGPS) server 240 for generating AA data 205 to be transmitted to the broadcasting terminal 210, and a broadcasting network, i.e., a DMB network, for carrying the generated AA data 205 to the broadcasting terminal 210. The DMB network shows both S-DMB and T-DMB. That is, for a S-DMB network, the DMB network includes a broadcasting provider server 230, a DMB satellite 203, and a plurality of gap fillers 221, 223, and 225, and for a T-DMB network, the DMB network includes the broadcasting provider server 230, a T-DMB transmitting station 107, and the plurality of gap fillers 221, 223, and 225, wherein the broadcasting provider server 230 can be a broadcasting center for S-DMB or a broadcasting station for T-DMB.

Since the DMB system is a broadcasting system, the DMB system has a one-directional channel. Thus, the broadcasting terminal 210 cannot request for the AA data 205. Accordingly, the DMB system divides an entire service area into a plurality of areas, sets a reference position for each area, generates AA data based on the reference position, and transmits the generated AA data to the broadcasting terminal 210. The AA data includes rough code phases and rough Doppler frequencies, which are required to search for a GPS signal, and is used to reduce an initial GPS signal acquisition time by reducing a code and frequency search range when the broadcasting terminal 210 processes the GPS signal. Since a method of searching for a GPS signal using code phase and Doppler frequency information is the publicly known technology and is not related to the scope of the present invention, a detailed description thereof has been omitted.

A method for the AGPS server 240 to generate the AA data 205 will now be described. The AGPS server 240 divides the entire service area into a plurality of areas and sets a reference position of each area in order to generate the AA data 205. The entire service area can be divided based on provinces, such as Seoul, Kyoung-ki, Busan, and so on, or divided using other various methods. For example, it is assumed that the entire service area is divided based on provinces as illustrated in FIG. 2. If it is assumed that FIG. 2 illustrates the Seoul province, it is assumed that an area Identifier (ID) is A, its radius is 30 Km, and the center position is already known and becomes a reference position of the generation of the AA data 205. In addition, it is assumed that the T-DMB transmitting station 107 places at the center position. The plurality of gap fillers 221, 223, and 225 for relaying an S-DMB or T-DMB signal exist in the area A.

The AGPS server 240 calculates a code phase and a Doppler frequency of each GPS satellite 101 based on the center position of the area A, i.e., the T-DMB transmitting station 107. The reference position is not necessarily the center position of the area A, and the position of the T-DMB transmitting station 107 is not necessarily at the center position of the area A, either. For other provinces, a code phase and a Doppler frequency of each GPS satellite 101 are calculated in the same manner. If AA data for the entire service area is calculated, the AA data 205 is transmitted to the broadcasting provider server 230 and broadcasted through the DMB satellite 203 or the T-DMB transmitting station 107, and the plurality of gap fillers 221, 223, and 225. A broadcasting period of the AA data 205 varies according to a system and broadcasting channel state.

The AA data 205 will now be described in detail with reference to FIGS. 3A and 3B.

Figure 3A:
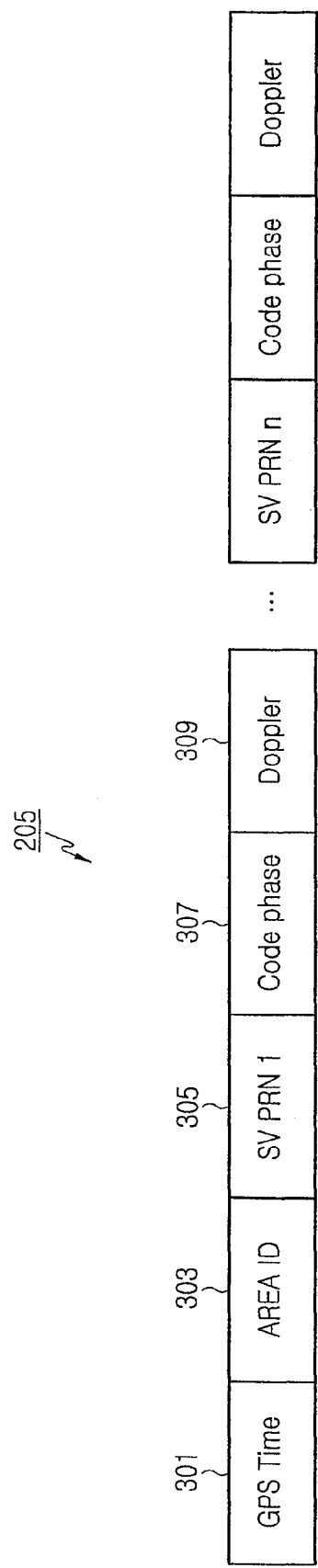
FIG. 3A is a chart illustrating a configuration of Acquisition Assistance (AA) data including an area Identifier (ID) transmitted through a broadcasting channel in a Digital Multimedia Broadcasting (DMB) system according to the present invention.
Figure 3B:
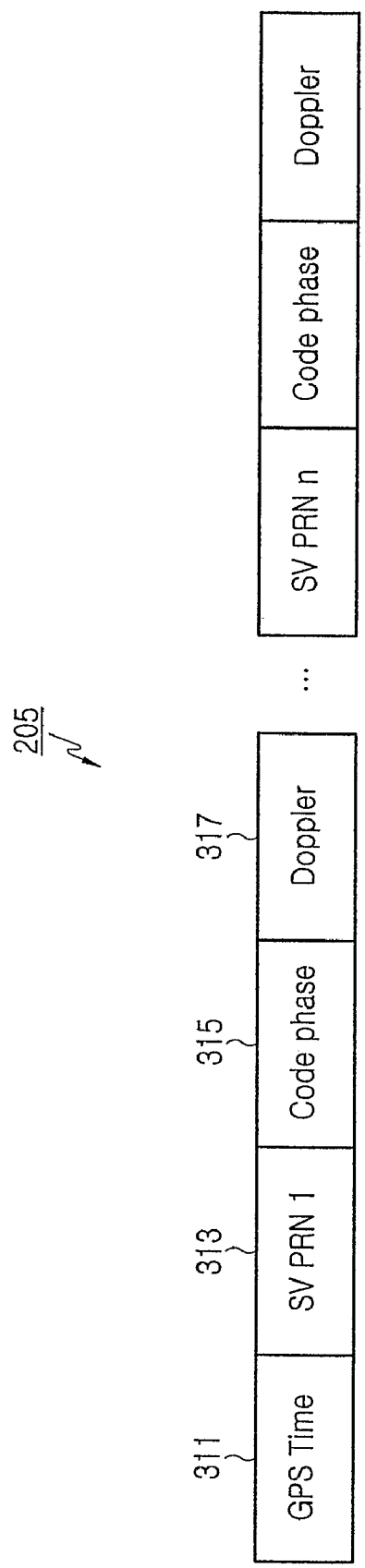
FIG. 3B is a chart illustrating a configuration of AA data without an area ID transmitted through a broadcasting channel in a DMB system according to the present invention.

FIGS. 3A and 3B are tables illustrating configurations of the AA data 205 transmitted through a broadcasting channel in a DMB system according to the present invention FIGS. 3A and 3B are applied according to the number of areas divided based on coverage.

FIG. 3A illustrates a configuration of the AA data 205 used in a DMB system, such as a T-DMB system, in which an entire service area is divided into a plurality of areas, according the present invention. Referring to FIG. 3A, the AA data 205 includes a GPS time 301, an area ID 303, a Satellite Vehicle Pseudo Random Number (SV PRN) 305, a code phase 307, and a Doppler frequency 309. The GPS time 301 indicates a reference time to apply the AA data 205. The area ID 303 is information indicating a reference position of each area and is used for the broadcasting terminal 210 to determine whether the received AA data 205 is information related to an area in which the broadcasting terminal 210 is located. The SV PRN 305 is code information for identifying each GPS satellite 107. The code phase 307 and the Doppler frequency 309 are information required to search for a GPS signal of each GPS satellite 101.

In FIG. 3A, the AA data 205 includes the area ID 303 indicating a valid area. When the entire service area is divided into a plurality of areas and every DMB transmitting station or DMB satellite broadcasts AA data of the entire service area, the area ID 303 is used for the broadcasting terminal 210 to select only AA data valid to an area in which the broadcasting terminal 210 is located.

FIG. 3B is a table illustrating a configuration of the AA data 205 used in a DMB system, such as a T-DMB system, for providing a broadcasting service to a single area according to the present invention.

Referring to FIG. 3B, the AA data 205 includes a GPS time 311, an SV PRN 313, a code phase 315, and a Doppler frequency 317. The GPS time 311 indicates a reference time to apply the AA data 205. The SV PRN 313 is code information for identifying each GPS satellite 107. The code phase 315 and the Doppler frequency 317 are information required to search for a GPS signal of each GPS satellite 101.

In FIG. 3B, the AA data 205 does not include an area ID. When the entire service area is divided into a plurality of areas and a DMB transmitting station of a certain area broadcasts only AA data valid to the certain area, a separate area ID is unnecessary. That is, since the AA data 205 received by the broadcasting terminal 210 in the certain area is AA data valid in the certain area, a process of identifying an area can be omitted. Thus, as compared to the AA data 205 illustrated in FIG. 3A, the AA data 205 illustrated in FIG. 3B has an advantage in that an amount of data to be transmitted is small and a time taken for the broadcasting terminal 210 to process the data is reduced. The AA data 205 illustrated in FIGS. 3A and 3B can be used so as to be suitable for the DMB system.

In the DMB system, the broadcasting terminal 210 can previously store the AA data 205 received through the T-DMB transmitting station 107, or the gap filler 221, 223, or 225 in its memory and use the stored AA data 205 when necessary, or can use the AA data 205 by receiving a DMB signal in real-time. In this case, the broadcasting terminal 210 searches for the AA data 205 necessary thereto and uses the found AA data 205. In order for the broadcasting terminal 210 to search for the AA data 205 necessary thereto, the broadcasting terminal 210 searches for an area ID of the received AA data 205 corresponding to its area and uses the found AA data 205 if a format of the AA data 205 is the same as that illustrated in FIG. 3A, or use the received AA data 205 without the search process if the format of the AA data 205 is the same as illustrated in FIG. 3B.

Two methods for the broadcasting terminal 210 to search for its area using the area ID 303 when the AA data 205 illustrated in FIG. 3A is used will now be described.

Figures 4A, 4B:
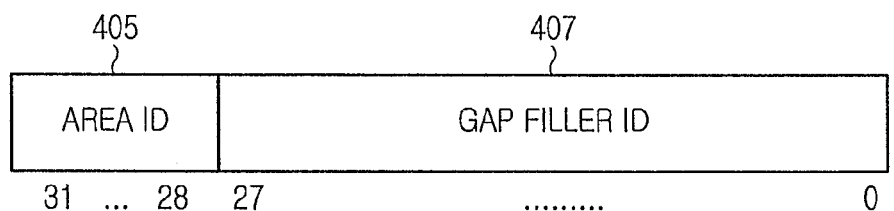
FIG. 4A is a table illustrating area IDs corresponding to gap filler IDs in a DMB system according to the present invention.
FIG. 4B illustrates a configuration of a gap filler ID in a DMB system according to the present invention.

The first method is a method for the broadcasting terminal 210 to establish a table so that gap filler IDs received from the plurality of gap fillers 221, 223, and 225 respectively correspond to associated areas and previously store the table in the mobile terminal's memory. In the DMB system according to the present invention, the broadcasting terminal 210 may store a table in which area IDs 401 respectively correspond to gap filler IDs 403 as illustrated in FIG. 4A. For example, the broadcasting terminal 210 can use the table so that the area ID 303 is recognized as ID-A if a received gap filler ID is in a range between "ID001" through "ID100", the area ID 303 is recognized as ID-B if the received gap filler ID is in a range between "ID 101" through "ID200", and the area ID 303 is recognized as ID-C if the received gap filler ID is in a range between "ID201" through "ID301". If a gap filler ID currently received by the broadcasting terminal 210 is "ID001", it can be known that a user places in the area A. The first method can be differently set according to an area.

The second method is a method of allocating an area ID field to a portion of a gap filler ID field received from the gap filler 221, 223, or 225 to the broadcasting terminal 210 as illustrated in FIG. 4B. That is, when the number of bits of the gap filler ID field is 32, 4 most significant bits are allocated to an area ID field 405, and the remaining 28 bits are allocated to a gap filler ID field 407. For example, if a value obtained by decoding the entire gap filler ID field of 32 bits is "A0000001h", since 4 most significant bits indicate "A", the broadcasting terminal 210 places in the area A, and a gap filler ID is "1h".

The first and second methods can be applied according to a system characteristic. That is, the first method can be easily applied to an existing DMB system without changing components of the DMB system, and the second method can be easily applied when a system is initially constructed.

Figure 5:
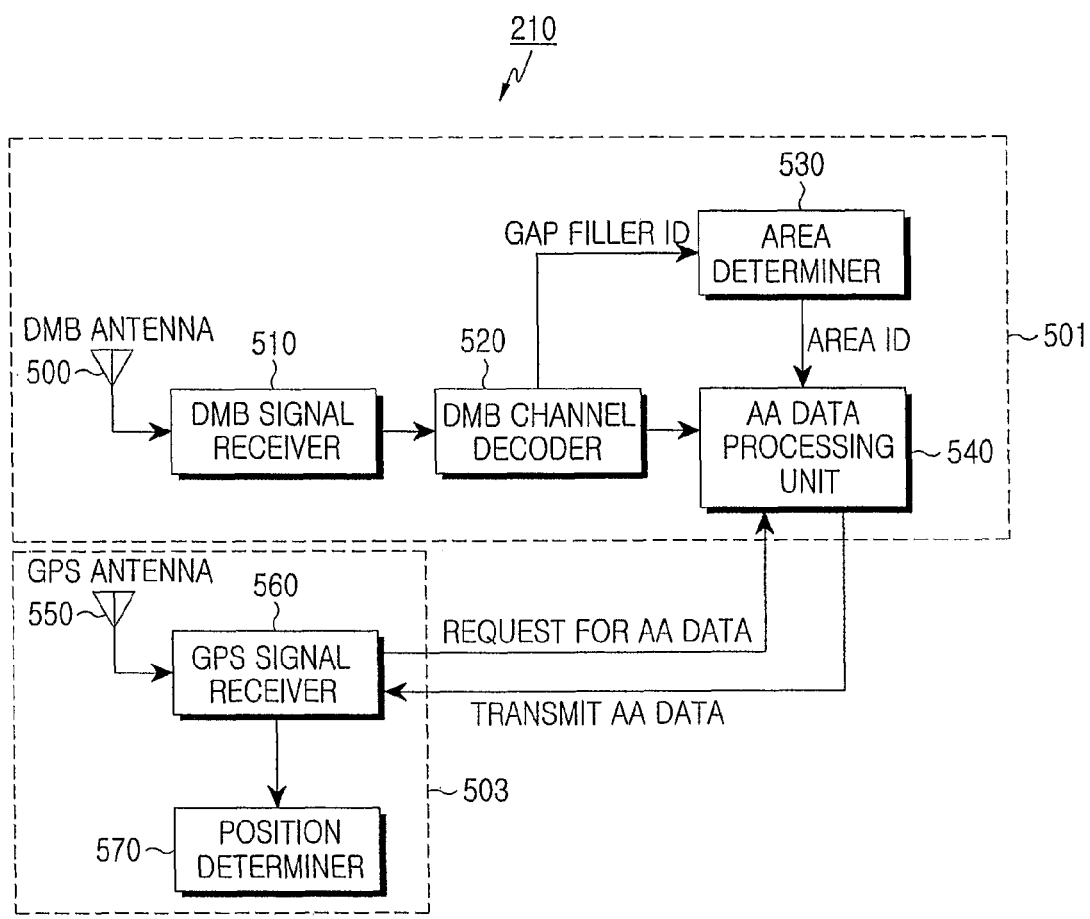
FIG. 5 is a block diagram illustrating a mobile terminal in a DMB system according to the present invention.

FIG. 5 is a block diagram of the broadcasting terminal 210 in the DMB system illustrated in FIG. 2, according to the present invention.

Referring to FIG. 5, the broadcasting terminal 210 includes a broadcasting receiving part 501 for receiving a DMB channel and a GPS receiving part 503 for receiving a GPS signal. The broadcasting receiving part 501, which is a device for receiving a broadcasting signal, includes a DMB antenna 500 for receiving the broadcasting signal, a DMB signal receiver 510, a DMB channel decoder 520, an area determiner 530, and an AA data processing unit 540. The GPS receiving part 503 includes a GPS antenna 550, a GPS signal receiver 560, and a position determiner 570.

The components of the broadcasting terminal 210 will now be described in detail. The DMB signal receiver 510 receives a broadcasting signal, i.e., a DMB signal, through the DMB antenna 500. The DMB channel decoder 520 extracts a gap filler ID by decoding the received DMB signal and transmits the extracted gap filler ID to the area determiner 530. In addition, the DMB channel decoder 520 decodes AA data 205 from the received DMB signal and transmits the decoded AA data 205 to the AA data processing unit 540.

The area determiner 530 determines an area ID of an area in which the broadcasting terminal 210 places from the gap filler ID received from the DMB channel decoder 520. The area ID can be determined by extracting the area ID from the gap filler ID using a table stored in a predetermined memory (not shown) or directly extracting the area ID included in the gap filler ID as described above. If the broadcasting terminal 210 currently receives the DMB signal from the DMB satellite 203 instead of a gap filler 221, 223, or 225, the broadcasting terminal 210 can use an area ID extracted using a previously received gap filler ID as a current area ID. If the broadcasting terminal 210 currently receives the DMB signal from the T-DMB transmitting station 107, the broadcasting terminal 210 can extract an area ID using an ID of the T-DMB transmitting station or frequency information allocated to the T-DMB transmitting station. When the DMB signal is broadcasted by dealing with the entire service area as a single area, i.e., when an area ID is not used as illustrated in FIG. 3B, the area determiner 530 can be omitted.

The AA data processing unit 540 manages the AA data 205 included in DMB channel data received from the DMB channel decoder 520. In detail, the AA data processing unit 540 stores AA data, and when an AA data request is received from the GPS signal receiver 560, if a format of the AA data is the same as that illustrated in FIG. 3A, the AA data processing unit 540 compares a current area ID to an area ID included in the AA data, and if the current area ID is the same as the area ID included in the AA data, the AA data processing unit 540 transmits the AA data 205 to the GPS signal receiver 560. If the format of the AA data is the same as that illustrated in FIG. 3B, the AA data processing unit 540 transmits the AA data 205 to the GPS signal receiver 560 without performing the area ID comparison process. The AA data processing unit 540 can store all received AA data, and alternatively, the AA data processing unit 540 can temporarily store received AA data when an AA data request is received from the GPS signal receiver 560. The storing process will be described in detail later.

When a GPS signal is processed by a user's request, the GPS signal receiver 560 of the GPS receiving part 503 requests the AA data processing unit 540 for AA data. If the AA data 205 is received from the AA data processing unit 540, the GPS signal receiver 560 searches for a GPS signal based on code phases and Doppler frequencies of relevant GPS satellites, which are included in the AA data 205, and transmits a GPS signal processing result to the position determiner 570.

The position determiner 570 calculates a position of the broadcasting terminal 210 using the GPS signal processing result. Here, since a process of calculating a position of the broadcasting terminal 210 is not included in the scope of the present invention, description of the terminal position calculation process has been omitted for the sake of clarity.

Methods of using the AA data 205 in the broadcasting terminal 210 will now be described. In the present invention, two methods can be used as described above. The first method is a method of storing all AA data 205 in the broadcasting terminal 210, and the second method is a method of receiving the AA data 205 when a GPS signal is searched.

Figure 6A:
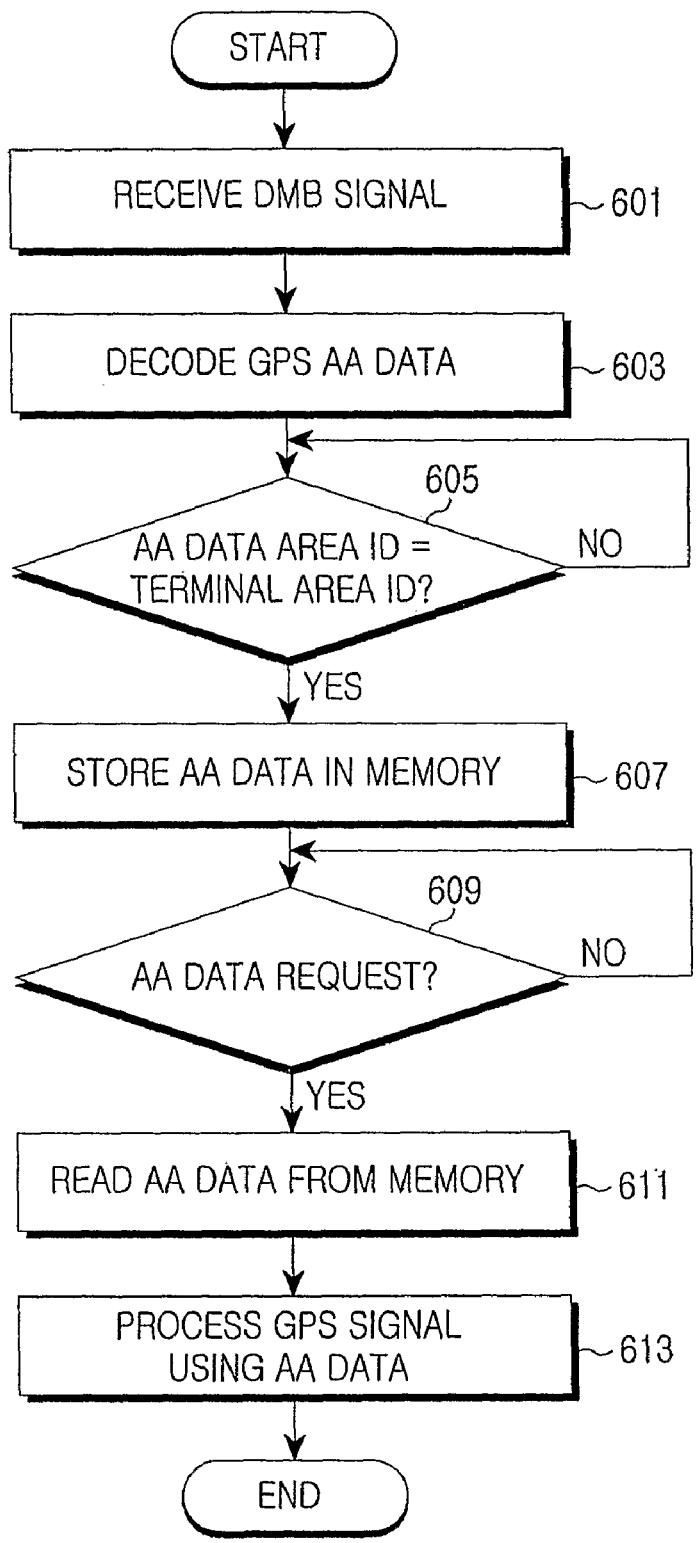
FIG. 6A is a flowchart illustrating a method for a mobile terminal in a DMB system to search for a GPS signal using the AA data illustrated in FIG. 3A, according to the present invention.

FIG. 6A is a flowchart illustrating a method for the broadcasting terminal 210 illustrated in FIG. 5 to search for a GPS signal when a format of the AA data 205 is the same as that illustrated in FIG. 3A in a DMB system, according to the present invention.

Referring to FIG. 6A, the DMB signal receiver 510 of the broadcasting terminal 210 receives a DMB signal in step 601. The DMB channel decoder 520 decodes the AA data 205 in step 603. The AA data processing unit 540 determines in step 605 whether the area ID 303 of the AA data 205 is the same as an area ID of the broadcasting terminal 210. The area ID of the broadcasting terminal 210 is extracted from a gap filler ID as described above.

If it is determined in step 605 that the area ID 303 of the AA data 205 is the same as the area ID of the broadcasting terminal 210, the AA data processing unit 540 stores the decoded AA data 205 in step 607. That is, the AA data processing unit 540 stores the AA data 205 of GPS satellites corresponding to a current area of the broadcasting terminal 210 in an internal memory. If the AA data processing unit 540 receives an AA data request from the GPS signal receiver 560 in step 609, the AA data processing unit 540 reads the stored AA data 205 from the memory in step 611. The GPS signal receiver 560 processes a GPS signal using code phase and Doppler frequency information of the AA data 205 in step 613.

Figure 6B:
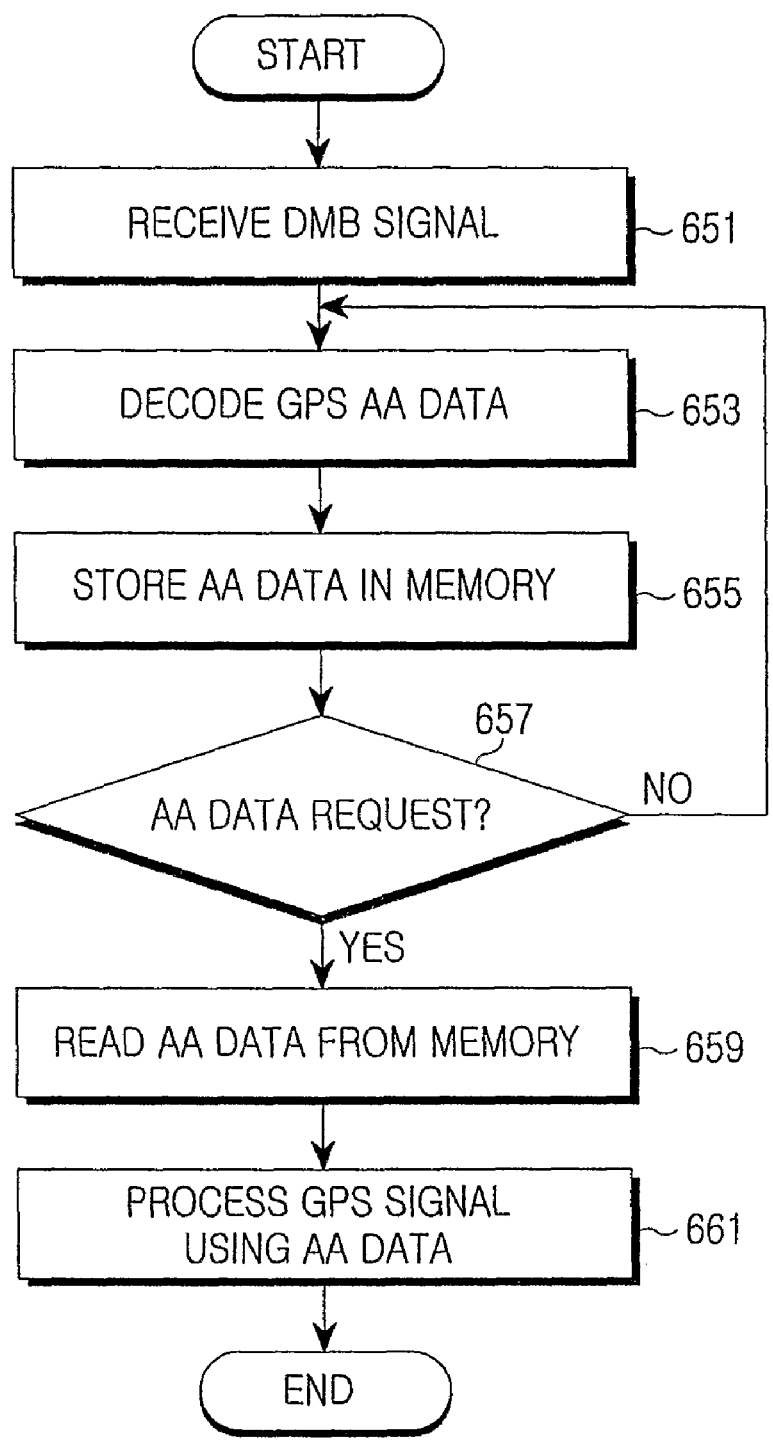
FIG. 6B is a flowchart illustrating a method for a mobile terminal in a DMB system to search for a GPS signal using the AA data illustrated in FIG. 3B, according to the present invention.

FIG. 6B is a flowchart illustrating a method for the broadcasting terminal 210 illustrated in FIG. 5 to search for a GPS signal when a format of the AA data 205 is the same as that illustrated in FIG. 3B in a DMB system, according to the present invention.

Referring to FIG. 6B, the DMB signal receiver 510 of the broadcasting terminal 210 receives a DMB signal in step 651. The DMB channel decoder 520 decodes the AA data 205 in step 653. The AA data processing unit 540 stores the decoded AA data 205 in step 655. That is, the AA data processing unit 540 stores the AA data 205 of GPS satellites corresponding to a current area of the broadcasting terminal 210 in an internal memory. If the AA data processing unit 540 receives an AA data request from the GPS signal receiver 560 in step 657, the AA data processing unit 540 reads the stored AA data 205 from the memory in step 659. The GPS signal receiver 560 processes a GPS signal using code phase and Doppler frequency information of the AA data 205 in step 661.

Figure 7A:
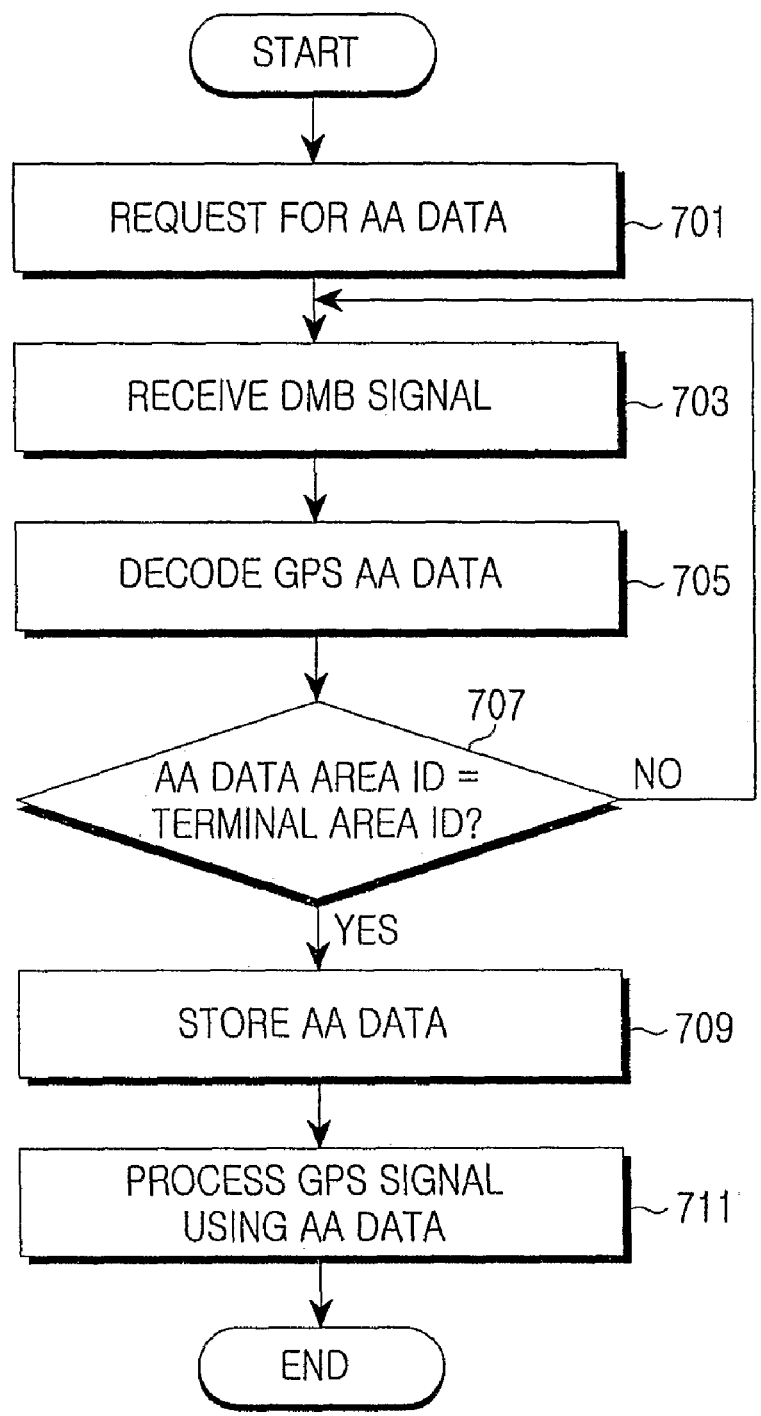
FIG. 7A is a flowchart illustrating a method for a mobile terminal in a DMB system to search for a GPS signal using the AA data illustrated in FIG. 3A, according to the present invention.

FIG. 7A is a flowchart illustrating a method for the broadcasting terminal 210 illustrated in FIG. 5 to search for a GPS signal when a format of the AA data 205 is the same as that illustrated in FIG. 3A in a DMB system, according to another preferred embodiment of the present invention.

Referring to FIG. 7A, if the AA data processing unit 540 of the broadcasting terminal 210 receives an AA data request from the GPS signal receiver 560 in step 701, the AA data processing unit 540 receives a DMB signal in step 703. The AA data processing unit 540 decodes the AA data 205 from the DMB signal in step 705. The AA data processing unit 540 determines in step 707 whether the area ID 303 of the decoded AA data 205 is the same as an area ID of the broadcasting terminal 210. The area ID of the broadcasting terminal 210 is extracted from a gap filler ID as described above. If it is determined in step 707 that the area ID 303 of the decoded AA data 205 is the same as the area ID of the broadcasting terminal 210, this process proceeds to step 709. If it is determined in step 707 that the area ID 303 of the decoded AA data 205 is different from the area ID of the broadcasting terminal 210, the AA data processing unit 540 repeats steps 703 through 707 to search for the AA data 205 of a current area of the broadcasting terminal 210.

The AA data processing unit 540 stores the AA data 205 in step 709. When the GPS signal receiver 560 processes a GPS signal, the GPS signal receiver 560 processes the GPS signal in step 711 using the AA data 205 stored in the AA data processing unit 540.

Figure 7B:
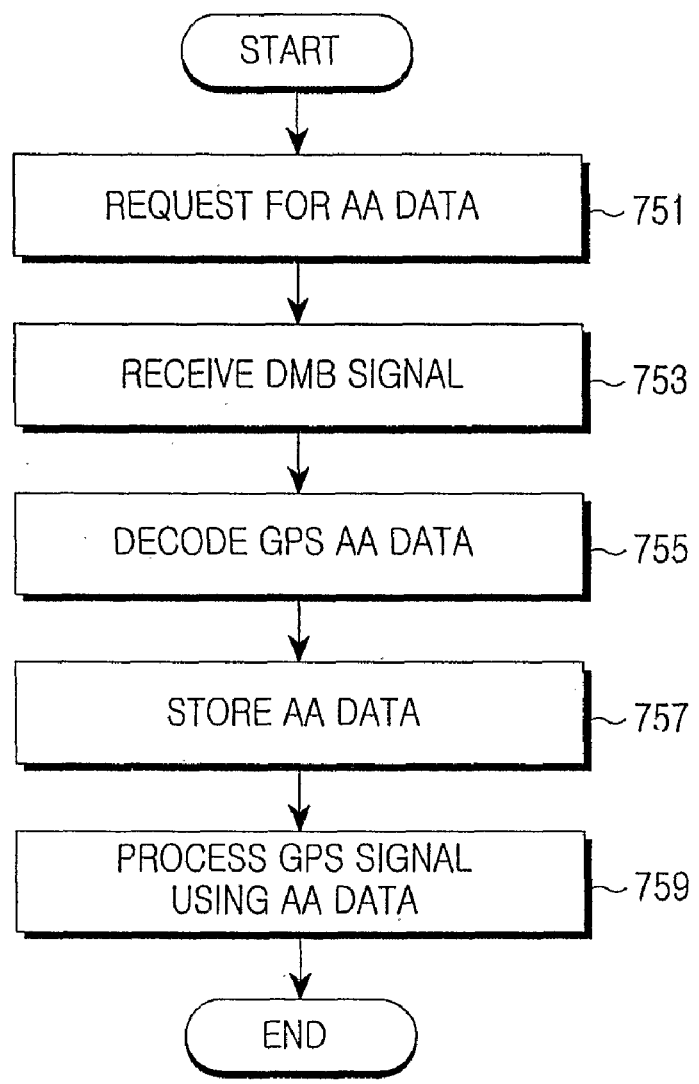
FIG. 7B is a flowchart illustrating a method for a mobile terminal in a DMB system to search for a GPS signal using the AA data illustrated in FIG. 3B, according to the present invention.

FIG. 7B is a flowchart illustrating a method for the broadcasting terminal 210 illustrated in FIG. 5 to search for a GPS signal when a format of the AA data 205 is the same as that illustrated in FIG. 3B in a DMB system, according to the present invention.

Referring to FIG. 7B, if the AA data processing unit 540 of the broadcasting terminal 210 receives an AA data request from the GPS signal receiver 560 in step 751, the AA data processing unit 540 receives a DMB signal in step 753. The AA data processing unit 540 decodes the AA data 205 from the DMB signal in step 755. The AA data processing unit 540 stores the AA data 205 in step 757. When the GPS signal receiver 560 processes a GPS signal, the GPS signal receiver 560 processes the GPS signal in step 759 using the AA data 205 stored in the AA data processing unit 540.

As described above, according to the present invention, if it is assumed that 1 chip of a GPS code is around 300 m and a radius of an area A is 30 Km as illustrated in FIG. 2, since a terminal can acquire a GPS signal within around 100 chips using a code phase of AA data received through a DMB channel, a code search time can be reduced. In addition, since a Doppler frequency variation of GPS satellites can be ignored, a frequency search time can be reduced using Doppler frequency values of the AA data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Digital Multimedia Broadcasting (DMB) system for providing a service by dividing an entire broadcasting service area into a plurality of areas, the DMB system comprising:
    an Assisted Global Positioning System (AGPS) server for generating Acquisition Assistance (AA) data that is distinguished by area based on a pre-set position in each of the plurality of areas;
    a transmitting station for broadcasting the AA data; and
    at least one terminal for acquiring an initial GPS signal by receiving the broadcasted AA data.

2. The DMB system of claim 1, wherein the AGPS server generates the AA data by calculating a code phase and a Doppler frequency of each GPS satellite based on the pre-set position in each of the plurality of areas.

3. The DMB system of claim 1, wherein the at least one terminal searches for a corresponding area based on data previously received from a gap filler and acquires a GPS signal using data corresponding to the corresponding area among the received AA data.

4. The DMB system of claim 1, wherein the AA data comprises:
    a GPS time field indicating time determined based on the GPS signal;
    a Satellite Vehicle Pseudo Random Number (SV PRN) field indicating code information for identifying each GPS satellite; and
    a code phase and Doppler frequency field for acquiring the GPS signal.

5. The DMB system of claim 4, wherein the AA data further comprises an area identifier (ID) indicating information indicating the pre-set position used as a reference in each of the plurality of areas.

6. The DMB system of claim 1, wherein the transmitting station periodically broadcasts the AA data.

7. A method of acquiring an initial Global Positioning System (GPS) signal in a Digital Multimedia Broadcasting (DMB) system for providing a service by dividing an entire broadcasting service area into a plurality of areas, the method comprising the steps of:

generating Acquisition Assistance (AA) data that is distinguished by area based on a pre-set position in each of the plurality of areas;
broadcasting the generated AA data; and
acquiring by at least one terminal a GPS signal by receiving the AA data.

8. The method of claim 7, wherein the step of generating AA data comprises:
calculating a code phase and a Doppler frequency of each GPS satellite based on the pre-set position in each of the plurality of areas; and
inserting the calculated code phase and Doppler frequency information into the AA data and broadcasting the AA data to the terminals.

9. The method of claim 7, wherein the step of broadcasting the generated AA data comprises:
determining, by the at least one terminal, a corresponding area based on data previously received from a gap filler; and
searching for a GPS signal using data corresponding to its area among the received AA data.

10. The method of claim 7, wherein the AA data comprises:
a GPS time field indicating time determined based on the GPS signal;
a Satellite Vehicle Pseudo Random Number (SV PRN) field indicating code information for identifying each GPS satellite; and
a code phase and Doppler frequency field for acquiring the GPS signal.

11. The method of claim 10, wherein the AA data further comprises an area identifier (ID) indicating information indicating the pre-set position used as a reference in each of the plurality of areas.

12. The method of claim 7, wherein the AA data is periodically broadcasted to the at least one terminal.

13. A terminal of a Digital Multimedia Broadcasting (DMB) system for providing a service by dividing an entire broadcasting service area into a plurality of areas, the terminal comprising:
a broadcasting receiving part for receiving a DMB signal including Acquisition Assistance (AA) data distinguished by area based on a pre-set position in each of the plurality of areas; and
a Global Positioning System (GPS) receiving part for acquiring an initial GPS signal based on the received AA data.

14. The terminal of claim 13, wherein the broadcasting receiving part comprises:
a DMB signal receiver for receiving the DMB signal;
a DMB channel decoder for extracting the AA data from the DMB signal; and
an AA data processing unit for receiving and storing the AA data and transmitting the stored AA data to the OPS receiving part when the AA data is requested from the GPS receiving part.

15. The terminal of claim 14, wherein the GPS receiving part comprises:
a GPS signal receiver for requesting the AA data processing unit for AA data of relevant GPS satellites and searching for a GPS signal using the AA data received from the AA data processing unit; and
a position determiner for determining a position of the terminal using the found result.

16. The terminal of claim 13, wherein the broadcasting receiving part comprises:
a DMB signal receiver for receiving the DMB signal;
a DMB channel decoder for extracting the AA data, which includes a gap filler identifier (ID) indicating each service area, from the DMB signal;
an area determiner for extracting area information based on the gap filler ID received from the DMB channel decoder and storing the extracted area information; and
an AA data processing unit for transmitting AA data to the GPS receiving part based on an area ID of currently received AA data and the area information previously stored in the area determiner when AA data is requested from the GPS receiving part.

17. The terminal of claim 16, wherein the area determiner comprises a table comprising the gap filler ID and an area corresponding to the gap filler ID.

18. The terminal of claim 16, wherein the area determiner extracts the area information using an area ID included in the AA data.

19. The terminal of claim 16, wherein the GPS receiving part comprises:
a GPS signal receiver for requesting the AA data processing unit for AA data of relevant GPS satellites and searching for a GPS signal using the AA data received from the AA data processing unit; and
a position determiner for determining a position of the terminal using the found result.

20. A method of acquiring an initial Global Positioning System (GPS) signal in a terminal of a Digital Multimedia Broadcasting (DMB) system for providing a service by dividing an entire broadcasting service area into a plurality of areas, the method comprising the steps of:
extracting AA data, which is distinguished by area based on a pre-set position in each of the plurality of areas, by receiving a DMB signal; and
acquiring an initial GPS signal based on the extracted AA data.

21. The method of claim 20, wherein the step of extracting AA data comprises:
determining an area corresponding to the location of the terminal based on an area Identifier (ID) indicating area information among data previously received from a gap filler; and extracting data corresponding to the area ID from the received AA data.

* * * * *